Figure 1:
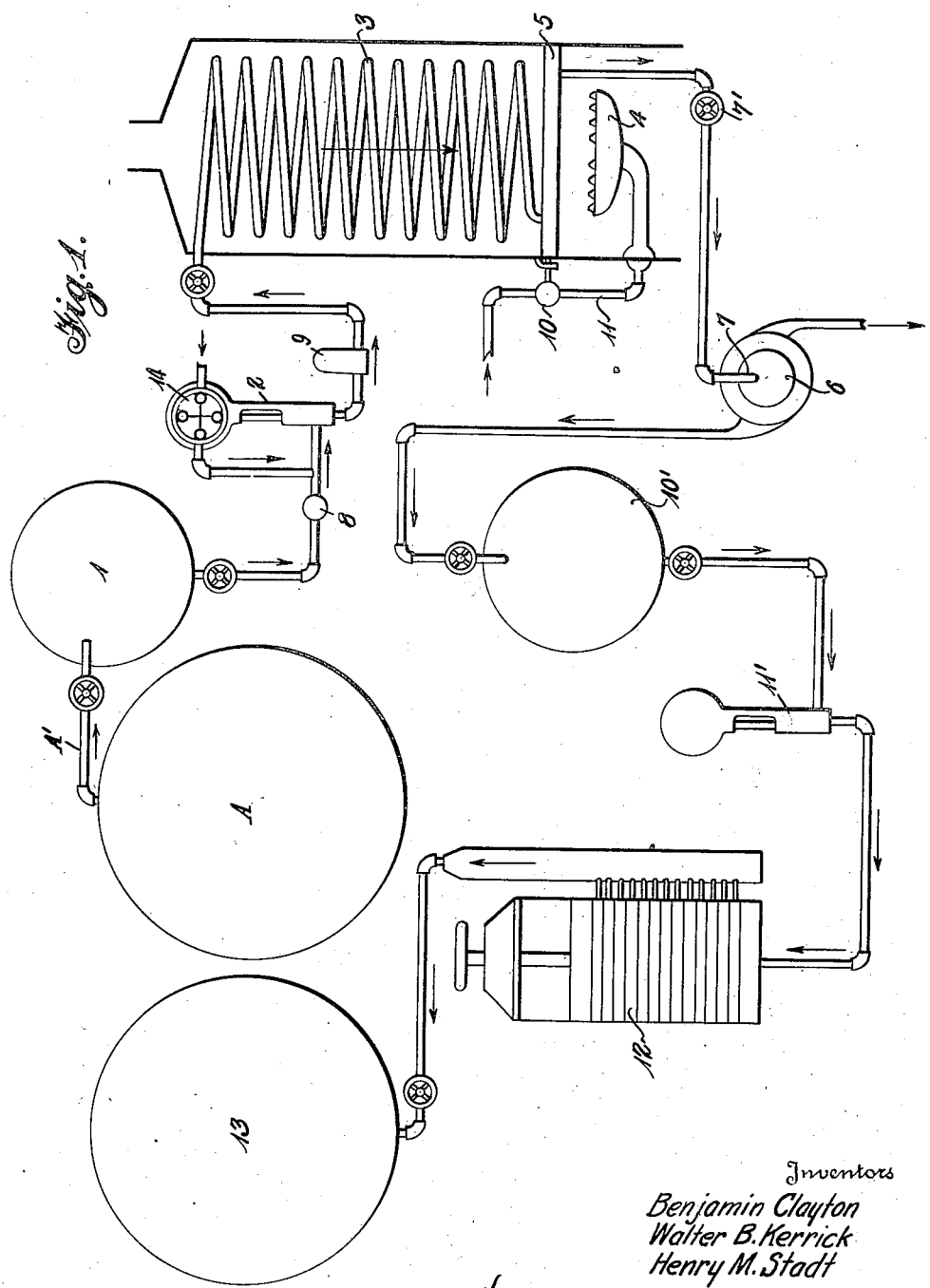

July 1, 1941.   B. CLAYTON ET AL   2,247,359
PROCESS FOR REFINING OILS
Original Filed Nov. 3, 1937   2 Sheets-Sheet 2

Inventors
Benjamin Clayton
Walter B. Kerrick
Henry M. Stadt
By Harris, Kiech, Foster & Harris
Attorneys Patented July 1, 1941

2,247,359

UNITED STATES PATENT OFFICE 2,247,359

PROCESS FOR REFINING OILS

Benjamin Clayton, Houston, Tex., and Walter B. Kerrick, Los Angeles, and Henry M. Stadt, Glendale, Calif., assignors to Refining, Inc., Reno, Nev., a corporation of Nevada Application November 3, 1937, Serial No. 172,622. Renewed March 11, 1940

19 Claims. (Cl. 260—424)

This invention relates to an improved process for refining oils, and more particularly vegetable, animal and certain other oils capable of separation and refining.

The principal object of the invention is to reduce the time period in the separation of the various constituents of oils, such as the "foots" from cottonseed and similar oils.

Another object is to more completely recover the more valuable constituents.

Another object is to promote the maximal separation by the addition of the minimal quantity of chemical reagents.

Another object is to minimize the conversion or transformation of the natural constituents of the oil by prolonged internal reactions.

Another object is to conserve all of the colloidal values in the oil in removing the solids therefrom.

Another object is to preserve and clarify the natural colors, flavors, odors, and other values desirable in commercial oil cuts or separations.

Another object is to avoid oxidation, fermentation, decomposition and other natural reactions incidental to the prolonged and involved processes heretofore practiced in this art.

Another object is to isolate and remove certain constituents present in some edible oils, such as the red coloring matter in cottonseed oil.

The above and other valuable results are largely due to the fact that expressed seed oils can be taken immediately from the press and the whole process of refining completed in a few minutes before chemical reactions and decompositions set in; in contradistinction to prior practices requiring longer periods of hours or even days, in some instances.

Other objects and advantages will appear as the description progresses.

In this specification and the accompanying diagram the invention is disclosed in its preferred form. It is to be understood, however, that it is not limited to this form because it may be practiced in other forms within the purview of the claims following the description.

The following disclosure will relate particularly to the treatment of expressed cottonseed oil, which teaching will guide those skilled in the art in treating other substances, without departing from the spirit of the invention.

The whole oil as it comes from the press contains hulls, linters, nitrogenous non-fatty materials such as gums, and the like. The soluble gums, albuminous and other impurities are not truly water solvent, but they imbibe or absorb water and swell, forming a glutinous sludge in the separator.

A desirable solution consists of about twelve percent (12%) of caustic soda in water, of which about one percent to two percent (1% to 2%) is added to the oil by volume for California cottonseed oil.

Figure 2:
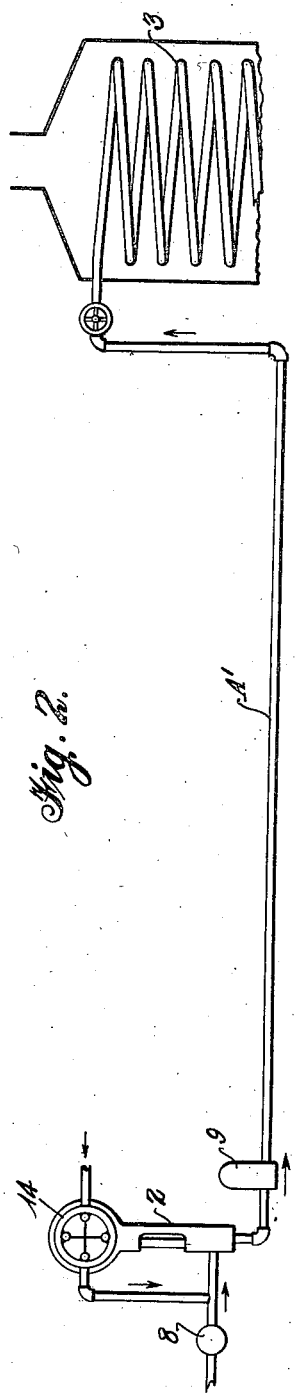

Figure 1 of the drawings diagrammatically shows a schematic apparatus useful in the practice of this invention, wherein the whole oil is pumped from the drip tank A, through the pipe A' to the mixing tank 1, and Figure 2 is a fragmentary view similar to Figure 1 showing an apparatus suitable for carrying on a modified process.

In the first step the reagent, such as alkali in solution, is mixed with the oil in the tank 1, from whence it is pumped into the descending coils 3 by the pump 2 in step two. These coils are properly enclosed above the burner 4. From the coils the oil passes through the thermostatic unit 5, after which it is jetted into the centrifuge 6, through the calibrated nozzle 7 in step three. The valve 7' is introduced into the flow line to manually regulate the amount of back pressure in the coils 3.

The back pressure at the nozzle reacts in the coils against the check valve 8 at the pump, to maintain the predetermined pressure on the oil. If a pulsating pump is used at 2, it is advisable to insert the air chamber 9 in the line to absorb the pulsations.

The oil passing through the thermostatic unit 5, controls the heat generated at 4, by controlling the throttle valve 10 controlling the fuel passing through the pipe 11, to the burner 4.

In this connection attention is directed to the co-pending applications in the name of Walter B. Kerrick, filed November 14, 1930, Serial Number 495,636, entitled Fluid heater and Method of treating liquids, Serial Number 495,634. These applications relate to the means and the method of treating colloids in the presence of alkali to accomplish a high state of hydrolysis.

In the practice of the present process it is important that in the coils 3 the oil and alkali be maintained in as constant volume or body as may be. That is, there should be no formation of vapors, foaming, or sudden or uneven expansion of the mixture within the apparatus.

It is advisable, therefore, to thus treat the oil by a continuous process in small active quantities rather than to attempt such fine degrees of regulation in larger "batches."

To that end it is important to calibrate the capacity of the discharge orifice of the nozzle 7, with respect to the measured input of the pump 2, so that the static pressure and constant volume may be maintained in the coils 3, while the dynamic pressure is increased by the application of heat.

It is desirable in the second step that the solution flow downwardly toward the source of heat so that the temperature of the solution progressively rises toward the discharge 7 from the heater.

It is important that the volume of heat be automatically regulated by the temperature of the solution. The maintained temperature of the oil can be manually or thermostatically controlled at 5.

There should be maintained coordination between the constant volume of input, output and the volume of heat applied to maintain the desired pressure in the coils 3. This will establish the proper velocity and turbulence of the oil within the coils, to insure the finest division of the alkali and diffusion of the alkaline solution within the oil. This is assisted by the progressively rising dynamic pressure, due to the thermal expansion of the oil, which causes an increased interstitial penetration and improved distribution of the alkali. Every molecule or globule of oil is acted upon by the solution and the interreactions are complete, as proved in the resultant product.

In the present invention the quantity of alkali is so minute that saponification is greatly reduced and the free oil is not attacked by the alkali.

The third step is completed by jetting the atomized oil mixture into the centrifuge 6, at atmospheric pressure, with an instant drop in temperature. Centrifuging this hydrolyzed oil from the heater removes the "foots" or "soap stock" resulting from the alkali treatment accomplished in the coils.

The fourth step consists of clarifying and bleaching the processed oil in the agitating tank 10' by the addition of clays or in any other conventional manner.

The fifth step is to pump the clarified oil by means of the pump 11, through the conventional filter press 12. The filtered oil drains from the filter press into the tank 13. The ultimate edible product is a clear, pure, light colored stock, practically free from the deleterious red color, with the natural flavor preserved.

In some of the methods heretofore practiced the whole oil is agitated at high temperature (145° F.) open to the atmosphere, for long periods, about 45 minutes, in the presence of an excess of alkali; then it often stands for days to permit separation by precipitation. The oil and soap stock are so long in contact during the settling of the oils, that decomposition sets in and new free fatty acids formed, defeating the purpose intended. The agitation also causes undesirable emulsification.

In the present instance the small quantity of alkali leaves scarcely a trace in the ultimate product, which is at no time subjected to a temperature greater than 100° F. at about 100 pounds pressure. The few minutes required to complete the process avoids decomposition, rancidity, or any deleterious interreactions. The oil is completely dehydrated by step three, which reduces the catalytic-like effect in the deterioration of the oils, disfavors the production of free fatty acids which give rise to rancid flavors, odors and the accompanying bacterial reactions.

The present process can be simplified and speeded up by accomplishing step one by injecting the alkali or alkaline solution into the flowing stream of oil from the tank A. This is done by introducing the reagent meter 14 into the oil line A'. If it is installed at the pump 2 as shown, it can be geared thereto and the quantity of alkali solution synchronized with the quantity of oil measured by the pump 2. It is obvious, however, if as shown in Figure 2, the alkali is introduced closer to the oil supply A, which may be remote from the heater 3, premixing with the oil will take place in the pipe A' before reaching the heater 3 and step two.

In this shorter process the "foots" and other heavier constituents comprising the whole oil are put through "step two" in the heater 3 without oxidation or atmospheric reactions. The nozzle 7 is discharged into the centrifuge to accomplish "step three." Thus, the modified process is truly continuous from the extractor at A to the centrifuge 12.

The reagent thus pumped into the line A' in measured quantity, enters the oil in filamentary form and performs its previously described reactions during step two. The ultimate result is the same in both instances. The particular advantage of the shorter process is that the whole separation can be accomplished in a few minutes after the oil leaves the seeds in the conventional pressing or extracting operation, as at the drip tank A. There may be certain oils, however, that are more adaptable to the shorter process.

The shorter process has the added advantage that the latent heat, acquired in the pressing and extracting operations, facilitates the rise in temperature transferred in the heater 3. This is a desirable economy and is superior to reheating the raw oil after it has chilled. Another advantage of the shorter process, which is carried on under plus pressure, is that the separated oil emerges from the heater 3, thoroughly sterilized.

The foots, etc., removed by centrifuge in step three show practically no free oil and are more easily divided into their constituent gums, resins and inert suspended matter, than when the whole oil is treated by any process heretofore practiced, so far as we are aware.

It is to be taken into consideration that certain substances contained in animal and vegetable oils and having reactions with acid can be treated by this process with an acid reagent. Processes of refining animal and vegtable oils with acid reagents are well known in the art and involve the treating of the oil with acids of sufficient strength to act upon coloring matters and impurities other than fatty acids to form the foots and render them separable from the oil. Thus, drying oils such as linseed or soya bean oil to be used for certain purposes are treated with from one-half to one and one-fourth percent of relatively strong acid, for example, a 60° Bé. sulfuric acid, to render impurities separable from the oil probably by dehydration of carbonization reactions upon the impurities. Other acids such as hydrochloric acid may be employed and in either case such acids will also attack the oils as well as impurities therein. Sulfuric acid will sulfonate the oils while hydrochloric acid will chlorinate them. Sulfuric acid is ordinarily used and any sulfonation of the oil is deleterious, for example, such sulfonation tends to interfere with the making of varnish oil due to discoloration when the oil is bodied by heat. By employing the process of the present invention with acid reagents, the time of contact of the reagent with the oil is minimized so that deleterious reactions of the acid upon the oil are largely eliminated, for example, the entire process may be performed within a few minutes. It is also a fact that in occasional instances refining separations can be accomplished without any reagent. In this operation the foots containing gums, resins, coloring materials, etc., which are present in animal and vegetable oils, are agglomerated or coalesced by the heat present in the mixture whereby to facilitate centrifugal separation thereof.

As an alternative operation in carrying out our broad invention as herein defined, we may preheat the oil before admixture with the refining reagent as shown in the Clayton et al application, Serial No. 685,130, filed August 14, 1933 now Patent 2,100,275, dated November 23, 1937. As as example, the oil may be preheated in stream flow, as shown in said application, to a temperature ranging, for example, from 100° F. to 200° F. depending upon the type of oil, the refining reagent or the properties of the refined oil desired. As an operative example, such temperatures ordinarily will range from 120 to 160. The invention, however, is not limited to any precise temperature range.

As a still further form of the broad invention herein disclosed, the mixture of the refined oil and foots may be introduced to a heated centrifugal separator with or without previous heating as shown, for example, in Clayton et al applications, Serial Nos. 34,258, filed August 1, 1935 now Patent 2,100,277, dated November 23, 1937, and Serial No. 678,574, filed July 1, 1933, or the oil may be preheated and led directly to the heated centrifuge with the refining reagent contacting therewith just before its introduction to the centrifuge or immediately thereafter so that the mixture is heated in the centrifugal to a temperature facilitating the separation.

In any event, the invention, irrespective of the specific steps thereof, may be employed for either complete or partial refining. By "partial refining" we mean an operation wherein gums and like foreign materials may be rapidly separated and recovered as a valuable by-product and the purified oil conditioned, if desirable, for further refining.

These various forms of the invention are set forth as illustrative examples but are not specifically claimed herein.

The exact procedure and reagents consistent in the practice of this invention can be varied to process various oils, depending upon their natures and the form of ultimate product desired, without departing from the spirit of the invention. Thus, the temperature of the mixture can be varied within wide limits, for example, from not substantially below 100° F. to approximately 200° F. depending upon the type of oil being treated and the characteristics desired in the refined oil. The temperature employed is sufficient to break any tight difficulty separable emulsion which may result from the mixing of the oil and reagent.

From the above, it will appear that our process involves the mixing of proportioned quantities of the oil to be refined and a reagent of the type set forth which is capable of combining with impurities in the oil to form soap stock. Thereafter, the stop stock is separated from the neutral oil. If centrifugal separation is employed, it is found that practically all the impurities are separated from the oil while therein but, in some cases, the subsequent equipment, including the filter press, may be used to remove the last traces of impurities from the oil.

It is desirable that the mixture of oil and soap stock be conditioned for this separation by the presence of a temperature facilitating this separation and by the maintenance of the soap stock uniformly distributed in the oil so that the mixture reaching the separator, a centrifuge in the hereinbefore example, will be uniform from time to time. It is known that, when such an oil and refining reagent are mixed in batches, an emulsion will form and that heat will assist in breaking this emulsion preparatory to separation. In the present invention, this phenomenon may be adapted to a continuous process in which the mixing is effected in a brief period and in which the reagent is in contact with the oil for such a brief period as to minimize saponification of the neutral oil, and this conditioning will desirably involve the presence of an emulsion-breaking temperature at the time of separation. When operating on those California cottonseed oils mentioned in the examples hereinbefore set forth, we have found it unnecessary to use temperatures in excess of 100° F. The elongated passage formed by the pipe of the heater 3 is very valuable in producing these and other conditioning effects.

If the reagent meter 14 is geared to the pump 2, as above-described, the reagent will be introduced into a stream of the oil at a rate proportional to the amount of oil pumped so that definite proportions of the oil and reagent are mixed. The proportion of such reagent needed to neutralize the fatty acid and complete the refining of the oil can be readily determined by any chemist skilled in the refining of such oils, or can be determined by trial. It is not desirable to use reagent in quantities much in excess of those necessary to refine the oil, thereby avoiding unnecessary action of the reagent on the oil itself.

This application is a continuation-in-part of our co-pending application, Serial No. 543,533, filed May 2, 1931 now Patent 2,100,274, dated November 23, 1937.

This application is also a continuation in part of our application Serial No. 631,002, filed August 30, 1932, entitled "Process of refining oils containing free fatty acids." As disclosed in said copending application, the invention is contradistinguished from the batch practice previously employed in that the period of treatment is materially shortened and refining losses are greatly reduced; that a temperature from 100 to 120° F. is usually suitable for high grade oils containing, for example, 0.6% of fatty acids. As also disclosed in said application, a water in oil emulsion usually results when streams of the refining reagent are admixed, under pump pressure, in stream flow, if the temperatures of the materials when admixed, are relatively low. As also explained in said copending application, the mixture is led to a conditioning zone where the foots are agglomerated into larger masses; that the conditions of agitation when going through said conditioning zone should avoid violent eddies and agitation which would result in the formation of emulsions incapable of satisfactory centrifugal separation while at the same time the degree of agitation should be sufficient to establish adequate agglomeration. As also stated in said application, the temperature should be such as to lower the viscosity of the oil to a point where separation is efficiently accomplished.

We claim:

1. A process of purifying vegetable and animal oils containing impurities, comprising the steps of mixing measured quantities of oil and acid to effect substantial reaction of the impurities with said acid to form foots, thereafter continuously advancing a relatively small stream of the mixture through a heating zone, continuously and rapidly heating the stream as it passes through said zone to a temperature sufficient to facilitate centrifugal separation and promptly centrifugally separating the foots from the neutral oil.

2. A process of purifying vegetable and animal oils containing impurities, comprising the steps of mixing measured quantities of oil and a refining reagent to effect substantial reaction of the impurities with said reagent to form foots, thereafter continuously advancing a relatively small stream of the mixture through a heating zone, continuously and rapidly heating the stream as it passes through said zone to a temperature sufficient to facilitate centrifugal separation, and promptly centrifugally separating the foots from the purified oil.

3. In the purification of vegetable and animal oils containing impurities, a quick continuous process comprising mixing measured quantities of oil and acid for a brief period to effect substantial reaction of the impurities contained in the oil with said reagent to form foots, thereafter promptly centrifugally separating the purified oil from the foots, the process being characterized by limiting the time of contact of the reagent and oil to such a brief period as to minimize reaction of the acid refining agent with the purified oil and by the mixture of foots and oil having an elevated temperature at the time of undergoing centrifugal separation sufficient to condition the mixture for separation of the foots from the oil.

4. In the purification of vegetable and animal oils containing impurities, a quick continuous process comprising mixing small quantities of oil and a refining reagent for a brief period to react with impurities contained in the oil to form foots, rapidly conditioning the mixture of foots and oil for the step of separating it into its constituents with the aid of an elevated temperature sufficient to facilitate centrifugal separation of the foots from the purified oil, and thereafter promply centrifugally separating the purified oil from the foots before said temperature has been substantially reduced and limiting the time of contact of the oil and reagent to such a brief period as to minimize reaction with the purified oil.

5. In the continuous process of purifying vegetable and animal oils containing impurities, including color impurities, the process comprising advancing small measured quantities of oil and a refining reagent in constant predetermined proportions to a mixing zone which is closed to prevent such quantities of air as will produce a stiff emulsion, rapidly and thoroughly mixing said small metered quantities of oil and reagent to effect rapid and substantial reactions of impurities with said reagent in said mixing zone to form foots, limiting the duration of the mixing to a period of less than five minutes to a minimized reaction with purified oil, continuously pumping the resultant mixture through an elongated conduit closed from the atmosphere, applying heat to the relatively small volume of said mixture advancing through said conduit at a rate sufficient to rapidly heat the same to such a temperature as will facilitate centrifugal separation, maintaining the mixture in said conduit in a condition of movement sufficient to prevent local overheating and stratification of the foots formed in the mixing zone, limiting the duration of heating to such a relatively few minutes as to avoid excessive reactions of oil with said refining reagent and promptly continuously delivering the thus conditioned mixture from the heating zone to a centrifugal separator and separating foots including coloring matter from the oil therein.

6. A process of purifying vegetable and animal oils containing free fatty acid comprising the steps of mixing measured quantities of oil and a refining reagent capable of attacking said oil and of effecting precipitation of the impurities therein contained and to form foots, thereafter continuously advancing a relatively small stream containing the oil and foots to a centrifugal separator and there effecting continuous separation of the foots from said oil with the aid of a sufficiently high temperature to facilitate such separation, the process being characterized by limiting the time of contact of the chemical reagent and the oil to such a brief time as to minimize attacks upon the neutral oil by the said reagent.

7. In the purification of animal and vegetable oils containing impurities, a process comprising mixing the oils with a refining reagent to form foots, centrifugally separating the foots from the purified oil with the aid of heat sufficient to facilitate such separation, the process being characterized by limiting the time of contact of the refining reagent and the oil, in such heated condition, for such a brief time as to minimize losses of the purified oil.

8. In the purification of vegetable and animal oils containing impurities including free fatty acids, gums and coloring matter, a process comprising the steps of pumping together in generally angular directions relatively small metered streams of oil and a refining reagent capable of precipitating impurities to form foots in substantially constant pre-determined proportions, advancing the said materials from their point of contact, under super-atmospheric pressure, to a conditioning zone, agglomerating the precipitated impurities to form substantially uniformly sized, centrifugally separable foots with the aid of sufficient time and temperature as the mixture passes through said zone, maintaining a state of movement favorable to such agglomeration to condition the mixture for the act of centrifugal separation, advancing the thus conditioned mixture with the aid of super-atmospheric pressure to a centrifugal separator while maintaining a rate of flow sufficient to prevent stratification thereof and centrifugally separating the thus substantially uniformly agglomerated foots from the purified oil.

9. In the purification of vegetable and animal oils containing impurities including free fatty acids, gums and coloring matter, a process comprising the steps of pumping together in generally angular directions relatively small metered streams of oil and a refining reagent in substantially constant, predetermined proportions whereby to quickly mix said streams and to effect rapid precipitation of at least some of said impurities in the form of foots, excluding the incorporation of such quantities of air as the streams are being mixed as would produce a difficultly separable emulsion, advancing, as a stream, the thus produced mixture of oil and foots to a conditioning zone, under super-atmospheric pressure and there agglomerating the precipitated impurities to form substantially uniformly sized, centrifugally separable foots while maintaining a state of movement, time and temperature favorable to such agglomeration, advancing the thus conditioned mixture, under super-atmospheric pressure, from the conditioning zone to a centrifugal separator while maintaining a rate of flow sufficient to prevent stratification thereof in its passage and centrifugally separating the substantially uniformly agglomerated foots from the purified oil.

10. In the purification of vegetable and animal oils containing impurities including free fatty acids, gums and coloring matter, a process which comprises the steps of pumping together relatively small metered streams of oil and a refining reagent in substantially constant, predetermined proportions to effect quick precipitation of the impurities in the form of foots, advancing the said materials from the said point of stream contacting thereof, under super-atmospheric pressure, to a conditioning zone, agglomerating the precipitated impurities with the aid of sufficient time and temperature as the mixture passes through said zone to facilitate centrifugal separation of the foots from the mixture while maintaining a state of movement favorable to such agglomeration, advancing the thus conditioned mixture by pump pressure to a centrifugal separator and centrifugally separating the thus substantially uniformly agglomerated foots from the purified oil.

11. In the purification of vegetable and animal oils containing impurities including free fatty acids, gums and coloring matter, a process comprising the steps of pumping together relatively small metered streams of oil and a refining reagent in substantially constant, predetermined proportions to effect substantially immediate precipitation of the impurities by the refining reagent to form foots, advancing under super-atmospheric pressure the said mixture to a conditioning zone while maintaining a sufficient temperature, pressure and time interval to effect the agglomeration of color impurities as the mixture passes through said zone, and centrifugally separating the substantially uniformly agglomerated foots from the purified oil.

12. In the purification of animal and vegetable oils containing impurities including free fatty acid, gums and coloring matter, a process which comprises the steps of pumping together in generally opposed directions relatively small metered streams of oil and a refining reagent in substantially constant, predetermined proportions whereby the refining reagent quickly precipitates said impurities to form foots, advancing a stream of said mixture to a conditioning receptacle and there providing sufficient time while maintaining a sufficient temperature to break any water-in-oil emulsion which may have been formed as a result of said stream mixing and to effect agglomeration of the precipitated material into the form of foots of substantially uniform size as the mixture passes through said conditioning receptacle and centrifugally separating the precipitated foots from the thus purified oil.

13. A process for the continuous refining of animal and vegetable oils containing impurities such as free fatty acids, gums and coloring matter, which comprises the steps of contacting constantly proportioned streams of the crude oil and a refining reagent to quickly precipitate at least some of said impurities to form foots, advancing the thus formed stream to a conditioning zone and there providing sufficient time and temperature to completely break any emulsion which may have resulted from said mixing and to effect desirable color reduction, pumping the thus conditioned mixture to a centrifugal separator at a rate sufficient to prevent stratification of the precipitated materials but insufficient to produce an inseparable mixture and centrifugally separating the foots from the purified oil.

14. A continuous process for purifying animal and vegetable oils, containing free fatty acids, gums and coloring matter, in a single once-through operation which comprises the steps of streaming together properly proportioned, metered and constant streams of the crude oil and a refining reagent to effect the formation of a water-in-oil emulsion and the consequent quick precipitation of the impurities and form foots, under conditions excluding the incorporation of such quantities of air as would form an inseparable air emulsion, quickly breaking the said water-in-oil emulsion with the aid of an emulsion breaking temperature, allowing sufficient time thereafter to permit substantially uniform agglomeration of the foots and centrifugally separating the foots from the thus purified oil while the mixture is at a temperature sufficient to facilitate such separation.

15. A process for the refining of animal and vegetable oils containing impurities which comprises the steps of admixing with said oils a refining reagent capable of attacking the impurities and the oil to form foots, quickly conditioning the mixture for the act of centrifugal separation by the employment of sufficient heat for that purpose and centrifugally separating the foots from the oil before substantial attack upon the same whereby to minimize attack upon the neutral oil by the refining reagent.

16. A continuous process for the purification of vegetable and animal oils containing impurities including free fatty acids and coloring matter, in a single, once-through operation, which comprises the steps of pumping together, in generally angular directions, relatively small metered streams of the oil and a refining reagent to effect quick admixture of the streams and quick precipitation of said impurities to form foots, excluding air from the point of juncture of said streams in quantities sufficient to form an undesirably stiff emulsion, advancing the resultant mixture by the pump pressures maintained on said streams to a conditioning receptacle, maintaining a state of agitation therein insufficient to form an inseparable colloidal suspension while permitting agglomeration but sufficient to prevent stratification of the foots to interfere with centrifugal separation, advancing the thus conditioned mixture from the conditioning receptacle to a zone of centrifugation, under pump pressure to preclude stratification in its transit thereto, correlating the rate of centrifugation of the conditioned mixture with the rate of mixing whereby to provide the necessary time element in the continuous flow of the mixture through the conditioning receptacle and centrifugally separating the mixture while the same is at a temperature sufficient to facilitate such separation.

17. A process for the purification of animal and vegetable oils containing free fatty acids and coloring materials which comprises the steps of mixing, in stream flow, small quantities of an aqueous refining reagent and said oil to produce a water-in-oil emulsion to effect quick precipitation and form foots, immediately decelerating the rate of reaction of the refining reagent and said oil by heat sufficient to break the water-in-oil emulsion, thereafter further precipitating the impurities contained in the mixture by providing sufficient time for the foots to physically gather and agglomerate with impurities in a conditioning zone and centrifugally separating the agglomerated foots from the thus purified oil while at a temperature suitable for such separation.

18. In the purification of animal and vegetable oils containing impurities, a process comprising mixing the oils with a refining reagent to form foots, passing the mixture at a substantially constant volume and at a substantially constant velocity into a centrifugal, separating the foots from the purified oil in said centrifugal with the aid of heat sufficient to facilitate such separation, and limiting the time of contact of the refining reagent and the oil, while in a heated condition, for such a brief time as to minimize losses of the purified oil.

19. In the purification of animal and vegetable oils containing impurities, a process comprising the steps of mixing, under pump pressure, the oils with a refining reagent to precipitate the impurities and to form foots, introducing a substantially constant stream of the mixture to a conditioning zone for the further purification of the oil and agglomeration of the foots in the presence of heat facilitating such treatment, maintaining a coordination between the substantially constant volume of input, output and conditions of heat as the mixture passes through said conditioning zone to facilitate such purification and agglomeration, introducing the thus conditioned mixture, under pump pressure, into a centrifugal in a stream of substantially constant volume and velocity and there centrifugally separating the foots from the purified oil with the aid of heat sufficient to facilitate such separation, and limiting the time of contact of the refining reagent and the oil, in a heated condition, for such a brief period as to minimize losses of the purified oil.

BENJAMIN CLAYTON.
WALTER B. KERRICK.
HENRY M. STADT.

CERTIFICATE OF CORRECTION.

Patent No. 2,247,359.  July 1, 1941.

BENJAMIN CLAYTON, ET AL.

It is hereby certified that error appears in the printed specification of the above numbered patent requiring correction as follows: Page 2, second column, line 47, before the word "process" insert --other--; line 53, for "vegtable" read --vegetable--; line 64, for "of" after "dehydration" read --or--; page 3, first column, line 20, for "as" before "example" read --an--; line 65, for "difficulty" read --difficultly--; page 4, second column, line 27, claim 6, strike out "chemical"; and that the said Letters Patent should be read with this correction therein that the same may conform to the record of the case in the Patent Office.

Signed and sealed this 26th day of August, A. D. 1941.

(Seal)

Henry Van Arsdale,
Acting Commissioner of Patents.